US011097793B2

(12) United States Patent
Marchildon et al.

(10) Patent No.: US 11,097,793 B2
(45) Date of Patent: Aug. 24, 2021

(54) REAR TRACK ASSEMBLY FOR A VEHICLE

(71) Applicants: SOUCY INTERNATIONAL INC., Drummondville (CA); BOMBARDIER RECREATIONAL PRODUCTS INC., Valcourt (CA)

(72) Inventors: Louis-Frederic Marchildon, Drummondville (CA); Patrick L'Herault, St-Majorique de Grantham (CA); Allen Bernais, Magog (CA)

(73) Assignees: SOUCY INTERNATIONAL INC., Drummondville (CA); BOMBARDIER RECREATIONAL PRODUCTS INC., Valcourt (CA)

(*) Notice: Subject to any disclaimer, the term of this patent is extended or adjusted under 35 U.S.C. 154(b) by 315 days.

(21) Appl. No.: 15/897,969

(22) Filed: Feb. 15, 2018

(65) Prior Publication Data
US 2018/0237083 A1    Aug. 23, 2018

Related U.S. Application Data

(60) Provisional application No. 62/459,526, filed on Feb. 15, 2017.

(51) Int. Cl.
*B62D 55/084* (2006.01)
*B62D 55/10* (2006.01)
(Continued)

(52) U.S. Cl.
CPC ............ *B62D 55/084* (2013.01); *A61G 5/04* (2013.01); *A61G 5/041* (2013.01); *A61G 5/066* (2013.01);
(Continued)

(58) Field of Classification Search
CPC ...... B62D 55/084; B62D 11/20; B62D 55/04; B62D 55/065; B62D 55/10; B62D 55/104; B62D 55/244
See application file for complete search history.

(56) References Cited

U.S. PATENT DOCUMENTS 3,639,011 A * 2/1972 Cushman ............... B62D 55/08
305/165
3,712,688 A    1/1973 Russell
(Continued)

FOREIGN PATENT DOCUMENTS

AT            5022 B    8/1901
CA        962725 A1    2/1975
(Continued)

OTHER PUBLICATIONS

U.S. Appl. No. 15/897,969, filed Feb. 15, 2018.
U.S. Appl. No. 15/897,857, filed Feb. 15, 2018.
U.S. Appl. No. 15/898,006, filed Feb. 15, 2018.

*Primary Examiner* — Minnah L Seoh
*Assistant Examiner* — Conan D Duda
(74) *Attorney, Agent, or Firm* — BCF LLP

(57) ABSTRACT

A track assembly to be mounted on a vehicle. The track assembly has a frame, a drive wheel rotationally mounted to the frame, a front idler wheel assembly mounted to the frame, a rear idler wheel assembly mounted to the frame, and a track mounted around the front idler wheel assembly, the rear idler wheel assembly, and the drive wheel, and being in driving engagement with the drive wheel. The track has a plurality of traction lugs distributed along an outer surface of the track. Each traction lug of the plurality of traction lugs has a height in a range of 1.6 inches to 2.5 inches. A distance between a foremost point on the outer surface of the track
(Continued)

and a rearmost point on the outer surface of the track is between 54 inches and 65 inches.

20 Claims, 8 Drawing Sheets

(51) Int. Cl.

| | | |
|---|---|---|
| *B62D 55/125* | (2006.01) | |
| *B62D 55/14* | (2006.01) | |
| *A61G 5/06* | (2006.01) | |
| *B62D 55/30* | (2006.01) | |
| *B62D 55/065* | (2006.01) | |
| *A61G 5/04* | (2013.01) | |
| *B62D 55/24* | (2006.01) | |
| *B62D 55/04* | (2006.01) | |
| *B62D 11/20* | (2006.01) | |
| *B62D 55/104* | (2006.01) | |
| *B62D 55/26* | (2006.01) | |
| *B62M 27/02* | (2006.01) | |
| *B62K 5/01* | (2013.01) | |

(52) U.S. Cl.
CPC ............. *B62D 11/20* (2013.01); *B62D 55/04* (2013.01); *B62D 55/065* (2013.01); *B62D 55/10* (2013.01); *B62D 55/104* (2013.01); *B62D 55/125* (2013.01); *B62D 55/14* (2013.01); *B62D 55/24* (2013.01); *B62D 55/244* (2013.01); *B62D 55/26* (2013.01); *B62D 55/30* (2013.01); *B62D 55/305* (2013.01); *B62D 55/0847* (2013.01); *B62K 5/01* (2013.01); *B62M 2027/022* (2013.01); *B62M 2027/027* (2013.01)

(56) References Cited

U.S. PATENT DOCUMENTS

| | | |
|---|---|---|
| 3,724,580 A | 4/1973 | Adams |
| 3,857,616 A | 12/1974 | Tucker et al. |
| 4,069,883 A | 1/1978 | Cousineau |
| 4,459,932 A | 7/1984 | Hildebrand |
| 4,699,229 A * | 10/1987 | Hi rose .................... B62K 5/01 180/183 |
| 4,706,769 A | 11/1987 | Latourelle et al. |
| 4,810,043 A | 3/1989 | McIntosh |
| 4,865,141 A | 9/1989 | Gey |
| 4,881,609 A | 11/1989 | Purcell et al. |
| 4,962,941 A * | 10/1990 | Rembos .................... A61G 5/061 180/8.2 |
| 5,076,378 A | 12/1991 | Lagace |
| 5,330,019 A | 7/1994 | Cartwright |
| 5,547,268 A | 8/1996 | Hansen |
| 5,607,210 A | 3/1997 | Brazier |
| 5,855,248 A | 1/1999 | Rawson et al. |
| 6,006,847 A * | 12/1999 | Knight .................... B62D 55/04 180/9.25 |
| 6,095,275 A * | 8/2000 | Shaw .................... B62K 13/00 180/185 |
| 6,135,220 A | 10/2000 | Gleasman et al. |
| 6,155,363 A | 12/2000 | Matsumoto et al. |
| 6,164,399 A * | 12/2000 | Bays .................... B62D 55/0655 180/9.21 |
| 6,199,646 B1 | 3/2001 | Tani et al. |
| 6,318,483 B1 | 11/2001 | Garrett et al. |
| 6,318,484 B2 | 11/2001 | Lykken et al. |
| 6,510,913 B1 * | 1/2003 | Morin .................... B62M 27/00 180/182 |
| 6,609,771 B2 | 8/2003 | Morin et al. |
| 6,615,939 B1 | 9/2003 | Karales et al. |
| 6,626,258 B1 | 9/2003 | Forbes |
| 6,832,659 B1 | 12/2004 | Bares et al. |
| 6,866,108 B2 | 3/2005 | Borgwarth et al. |
| 6,874,586 B2 | 4/2005 | Boivin et al. |
| 6,982,563 B2 | 1/2006 | Phely et al. |
| 7,040,426 B1 * | 5/2006 | Berg .................... B62D 55/02 180/9.5 |
| 7,083,241 B2 | 8/2006 | Gunter |
| 7,255,184 B2 | 8/2007 | Loegering et al. |
| 7,311,160 B2 | 12/2007 | Lim |
| 7,389,846 B2 | 6/2008 | Grywacheski et al. |
| 7,461,712 B2 | 12/2008 | Law et al. |
| 7,497,530 B2 | 3/2009 | Bessette |
| 7,513,327 B1 | 4/2009 | Peterson |
| 7,597,161 B2 | 10/2009 | Brazier |
| 7,673,711 B1 | 3/2010 | Berg |
| 7,708,092 B2 * | 5/2010 | Despres ................ B62D 55/24 180/9.5 |
| 7,712,557 B2 * | 5/2010 | Duceppe .............. B62D 55/065 180/9.21 |
| 7,870,914 B2 * | 1/2011 | Todd ...................... B62D 55/04 180/185 |
| 7,874,387 B2 | 1/2011 | Despres |
| 7,921,942 B2 | 4/2011 | Schafer |
| 7,976,064 B2 | 7/2011 | Abdulaev |
| 8,007,058 B2 | 8/2011 | Bessette |
| 8,042,629 B2 | 10/2011 | Mackenzie |
| 8,056,655 B2 | 11/2011 | Mallette et al. |
| 8,056,656 B2 | 11/2011 | Todd et al. |
| 8,210,304 B2 | 7/2012 | Baldwin |
| 8,240,408 B2 | 8/2012 | Bernard et al. |
| 8,251,385 B2 | 8/2012 | Brazier |
| 8,297,383 B2 | 10/2012 | Despres |
| 8,312,945 B2 | 11/2012 | Bessette et al. |
| 8,613,332 B2 | 12/2013 | Zakuskin |
| 8,632,138 B2 | 1/2014 | Bessette |
| 8,662,214 B2 | 3/2014 | Zuchoski et al. |
| 8,695,735 B2 | 4/2014 | Afanador |
| 8,764,129 B2 | 7/2014 | Simula et al. |
| 8,776,931 B2 | 7/2014 | Boivin |
| 8,783,392 B2 | 7/2014 | Underwood |
| 8,794,358 B2 | 8/2014 | Hansen |
| 8,801,115 B2 | 8/2014 | Hansen |
| 8,844,665 B2 | 9/2014 | Wenger et al. |
| 8,851,581 B2 | 10/2014 | Marchildon et al. |
| 8,955,925 B2 | 2/2015 | Bessette et al. |
| 8,967,736 B2 | 3/2015 | Zakuskin |
| 9,004,510 B2 | 4/2015 | Leonard et al. |
| 9,033,430 B2 | 5/2015 | Zuchoski et al. |
| 9,211,921 B2 | 12/2015 | Zuchoski et al. |
| 9,260,145 B2 | 2/2016 | Korus et al. |
| 9,296,436 B2 | 3/2016 | Coe et al. |
| 9,352,776 B2 | 5/2016 | Hansen |
| 9,440,692 B2 | 9/2016 | Vik et al. |
| 9,457,831 B2 | 10/2016 | Rivard et al. |
| 9,505,432 B2 | 11/2016 | Pare et al. |
| 9,505,451 B2 | 11/2016 | Zuchoski et al. |
| 2002/0017403 A1 | 2/2002 | Phely |
| 2003/0025392 A1 * | 2/2003 | Morin .................... B62M 27/00 305/178 |
| 2004/0026995 A1 * | 2/2004 | Lemieux .............. B62D 55/244 305/178 |
| 2004/0159475 A1 | 8/2004 | Moor |
| 2005/0145422 A1 * | 7/2005 | Loegering ............ B62D 55/084 180/9.26 |
| 2006/0060395 A1 | 3/2006 | Boivin et al. |
| 2006/0158034 A1 | 7/2006 | Standish et al. |
| 2007/0107950 A1 | 5/2007 | Ki |
| 2007/0261898 A1 | 11/2007 | Bessette |
| 2008/0196947 A1 * | 8/2008 | Brazier .................... B60G 21/04 180/9.5 |
| 2008/0211299 A1 | 9/2008 | Wilt |
| 2009/0050389 A1 * | 2/2009 | Watling ................ B62D 55/07 180/190 |
| 2009/0065270 A1 | 3/2009 | Bordini |
| 2010/0012399 A1 * | 1/2010 | Hansen .................... B62D 55/04 180/9.26 |
| 2010/0060075 A1 * | 3/2010 | Hansen .................... B62D 55/04 305/15 |
| 2010/0206648 A1 | 8/2010 | Kelppe et al. |

(56) References Cited

U.S. PATENT DOCUMENTS

| | | | |
|---|---|---|---|
| 2010/0230185 A1* | 9/2010 | Mallette | B62D 15/00 |
| | | | 180/9.44 |
| 2011/0048817 A1* | 3/2011 | Bessette | B62D 55/084 |
| | | | 180/9.62 |
| 2011/0120793 A1* | 5/2011 | Lucarelli | B62M 27/02 |
| | | | 180/193 |
| 2011/0180335 A1 | 7/2011 | Ivankov et al. | |
| 2011/0186363 A1 | 8/2011 | Ivankov et al. | |
| 2011/0291473 A1* | 12/2011 | Reshad | B62D 55/244 |
| | | | 305/161 |
| 2011/0315459 A1 | 12/2011 | Zuchoski et al. | |
| 2012/0090903 A1 | 4/2012 | Bessette et al. | |
| 2012/0104840 A1* | 5/2012 | Zuchoski | B62D 55/10 |
| | | | 305/100 |
| 2012/0286565 A1* | 11/2012 | Marchildon | B62D 55/04 |
| | | | 305/132 |
| 2013/0181431 A1* | 7/2013 | McMahon | B60D 1/247 |
| | | | 280/839 |
| 2014/0034400 A1* | 2/2014 | Underwood | B62D 55/02 |
| | | | 180/9.34 |
| 2014/0035355 A1 | 2/2014 | He et al. | |
| 2014/0175864 A1 | 6/2014 | Marchildon et al. | |
| 2015/0035354 A1* | 2/2015 | Dandurand | B62D 55/244 |
| | | | 305/166 |
| 2015/0048672 A1 | 2/2015 | Okada | |
| 2015/0129329 A1 | 5/2015 | Cox | |
| 2015/0136497 A1 | 5/2015 | Morin | |
| 2015/0166133 A1* | 6/2015 | Eavenson, Sr. | B62D 55/10 |
| | | | 305/134 |
| 2015/0183464 A1 | 7/2015 | Mannering | |
| 2015/0321711 A1 | 11/2015 | Vik et al. | |
| 2015/0329154 A1 | 11/2015 | Roy | |
| 2015/0329155 A1 | 11/2015 | Marchildon et al. | |
| 2015/0375826 A1* | 12/2015 | Sampson | B62M 27/00 |
| | | | 180/190 |
| 2016/0016639 A1 | 1/2016 | Pard | |
| 2016/0052569 A1 | 2/2016 | Buchanan et al. | |
| 2016/0075384 A1 | 3/2016 | Mattson | |
| 2016/0114840 A1 | 4/2016 | L'Herault et al. | |
| 2016/0114841 A1* | 4/2016 | Gagne | B62D 55/244 |
| | | | 180/9.62 |
| 2016/0194038 A1 | 7/2016 | Jean et al. | |
| 2016/0200378 A1 | 7/2016 | Dandurand et al. | |
| 2016/0257358 A1 | 9/2016 | Johnson | |
| 2016/0304141 A1 | 10/2016 | Marchildon et al. | |
| 2017/0043821 A1* | 2/2017 | Dandurand | B62D 55/07 |
| 2017/0057573 A1* | 3/2017 | Gentry | B62D 55/108 |
| 2017/0120970 A1* | 5/2017 | Zuchoski | B62D 55/084 |
| 2017/0158267 A1* | 6/2017 | Boivin | B62D 55/084 |
| 2017/0233018 A1* | 8/2017 | Buchanan | B62D 55/125 |
| | | | 305/125 |
| 2017/0291652 A1* | 10/2017 | Marchildon | B62D 55/065 |
| 2017/0305483 A1* | 10/2017 | Rehberg | B62D 55/065 |
| 2018/0229783 A1* | 8/2018 | Marchildon | B62D 11/20 |
| 2018/0244326 A1 | 8/2018 | Zuchoski | |
| 2018/0265146 A1* | 9/2018 | Laplante | B62D 55/04 |
| 2018/0354568 A1 | 12/2018 | Gustafson | |
| 2019/0092405 A1* | 3/2019 | Dandurand | B62D 55/244 |
| 2019/0248432 A1* | 8/2019 | Gagne | B62D 55/10 |
| 2019/0248433 A1* | 8/2019 | Aubin-Marchand | B62D 55/14 |

FOREIGN PATENT DOCUMENTS

| | | |
|---|---|---|
| CA | 2226812 A1 | 7/1998 |
| CA | 2229247 A1 | 8/1999 |
| CA | 2296781 A1 | 7/2001 |
| CA | 2650933 A1 | 7/2009 |
| CA | 2677421 A1 | 8/2009 |
| CA | 2735095 A1 | 9/2012 |
| CA | 2612356 C | 10/2014 |
| CA | 2800044 C | 2/2016 |
| DE | 102007055196 A | 8/2009 |
| EP | 270237 A1 | 6/1988 |
| EP | 1110851 A1 | 6/2001 |
| EP | 1110852 A1 | 6/2001 |
| EP | 1237778 A1 | 9/2002 |
| EP | 1442969 B1 | 11/2006 |
| EP | 2391531 A1 | 12/2011 |
| ES | 2083342 A6 | 4/1996 |
| FR | 2663285 A1 | 12/1991 |
| RU | 2005118056 A | 12/2006 |
| RU | 2308396 C1 | 10/2007 |
| RU | 2329156 C2 | 7/2008 |
| RU | 2341402 C2 | 12/2008 |
| RU | 2347708 C2 | 2/2009 |
| RU | 2399539 C2 | 9/2010 |
| RU | 144342 U1 | 8/2014 |
| RU | 2577999 C2 | 3/2016 |
| WO | 2008049218 A1 | 5/2008 |
| WO | 2014056085 A1 | 4/2014 |
| WO | 2016109891 A1 | 7/2016 |
| WO | 2016131140 A1 | 8/2016 |

* cited by examiner

REAR TRACK ASSEMBLY FOR A VEHICLE

CROSS-REFERENCE

The present application claims priority to U.S. Provisional Patent Application Ser. No. 62/459,526, filed Feb. 15, 2017, entitled "Traction assembly and Vehicle", which is incorporated herein by reference in its entirety.

TECHNICAL FIELD

The present technology relates to track assemblies and vehicles having track assemblies.

BACKGROUND

All-Terrain Vehicles ("ATV's") are four-wheeled off-road vehicles. ATV's are designed for "all" terrains (i.e. many off-road terrains). ATV wheels are usable with "all" terrains but may not be optimized for one or more particular types of terrain. Given that wheels may not provide optimal traction on certain types of terrain, e.g. mud, snow, sand, etc., track systems were developed to be used on ATV's in place of the wheels. ATV's, however, including their frames, suspensions, and fairings, were designed for having wheels as ground-contacting elements, and not for having tracks.

Track systems have been developed to replace wheels of ATVs, in order to improve traction and/or flotation of the ATVs in some driving conditions. Wheels are circular in shape (and thus when rotated maintain the same shape—and are designed to be rotated in use) and are generally smaller than track systems. Tracks systems typically have frames that are triangular in shape and are generally larger than wheels.

Existing track systems are suitable for their intended purposes. However, improvements to existing systems are desirable.

SUMMARY

In conventional wisdom, to improve vehicle performance, such as acceleration, the horsepower of the vehicle's motor is increased. Such an approach is often practiced with snowmobiles.

However, as it has been found by the creators of the present technology, sometimes increasing a vehicle's motor horsepower may be relatively expensive and may not provide the desired performance improvements in some driving conditions. The creators of the present technology have found that this may more often be the case with vehicles such as ATVs and Side by Side vehicles, than with snowmobiles. In one aspect, the creators of the present technology have found that the propulsion mechanisms by which ATV and Side-by-Side track assemblies propel such vehicles differ from the propulsion mechanisms of snowmobiles, at least when such vehicles are used on snow.

In one aspect, the track of a snowmobile is designed to eject snow from under the track and thereby propel the snowmobile. ATV and Side-by-side vehicle tracks, on the other hand, often pull on snow trapped between traction lugs of the tracks in order to propel such vehicles. The creators of the present technology have found that this difference in propulsion mechanisms may be leveraged in some cases to provide vehicle performance improvements for some types of driving conditions and for some types of terrain without necessarily needing to increase a vehicle's horsepower.

For example, it has been found that providing a track assembly for an ATV or a Side-by-Side vehicle, the track assembly having a track with a track length that is in a particular range of track lengths improves vehicle performance, including acceleration, in at least some driving conditions. As another example, it has been found that providing a track assembly for an ATV or a Side-by-Side vehicle, the track assembly having a track with a track length that is in a particular range of track lengths, in combination with the track having traction lugs that have traction lug heights in a particular range of traction lug heights, improves vehicle performance, including acceleration, in at least some driving conditions.

It has also been found that providing particular combinations of track length and traction lug height(s) for an ATV or a Side-by-Side vehicle in a further combination with certain additional features described in this document, improves vehicle performance in at least some driving conditions. Thus, the present technology provides a track system for use with a vehicle, such as an ATV, a Side-by-Side vehicle, or other similar vehicles, provides improved vehicle performance, including acceleration, in at least some driving conditions, including at least some snow driving conditions.

In one aspect, there is provided herein a track assembly to be mounted to a rotatable rear axle of a vehicle, the rotatable rear axle being structured for mechanical attachment of a wheel thereto. The track assembly has a frame having a front, a rear, a bottom, a left side, and a right side. A drive wheel is rotationally mounted to the frame for rotation about a drive wheel axis positioned in a vertical drive wheel plane, the drive wheel having a peripheral surface. A front idler wheel assembly is mounted at the front of the frame for rotation about a front idler wheel assembly axis parallel to the drive wheel axis, the front idler wheel assembly having a peripheral surface. A rear idler wheel assembly is mounted at the rear of the frame for rotation about a rear idler wheel assembly axis parallel to the drive wheel axis, the rear idler wheel assembly having a peripheral surface.

Further, the track assembly has a track having an inner surface facing the drive wheel, and an outer surface opposite the inner surface, the outer surface having a plurality of traction lugs distributed along the outer surface. The drive wheel, the front idler wheel assembly and the rear idler wheel assembly are positioned relative to the frame to support the track around the drive wheel peripheral surface, the front idler wheel assembly peripheral surface, and the rear idler wheel assembly peripheral surface. The track is in driving engagement with the drive wheel. At least one of the front idler wheel assembly and the rear idler wheel assembly is selectively movable between a plurality of longitudinally-distributed tension positions to tension the track.

The track assembly is structured to be attached to the axle of the vehicle when the wheel is removed. In this embodiment, a distance between a foremost point on the outer surface of the track and a rearmost point on the outer surface of the track is between 54 inches and 65 inches, and each traction lug of the plurality of traction lugs has a height in a range of 1.6 inches to 2.5 inches.

In some embodiments, the track assembly further includes a longitudinally-extending left slide rail connected to the bottom of the frame and having a bottom surface, a front end, a rear end and a length; and a longitudinally-extending right slide rail connected to the bottom of the frame and having a bottom surface, a front end, a rear end, and a length.

In some embodiments, the drive wheel, wheels of the front idler wheel assembly and wheels of the rear idler wheel assembly are the sole wheels of the track assembly contacting the track.

In some embodiments, the track assembly further includes a plurality of mid-rollers, each mid-roller of the plurality of mid-rollers being connected to at least one of the left slide rail and the right slide rail to rotate about a mid-roller axis that defines a mid-roller plane with the drive wheel axis. In such embodiments, the mid-roller plane defines an angle with the vertical drive wheel plane that has a magnitude of not more than 20 degrees.

In some embodiments, the plurality of mid-rollers is positioned relative to the left slide rail and the right slide rail such that each mid-roller in the plurality of mid-rollers extends downward past the bottom surface of each of the left slide rail and the right slide rail by 2/25.4 inches to 6/25.4 inches (2 millimetres to 6 millimetres, respectively).

In some embodiments, the track assembly further includes a longitudinally-extending central slide rail connected to the bottom of the frame. In such embodiments, the central slide rail is positioned between the left slide rail and the right slide rail.

In some embodiments, each traction lug of the plurality of traction lugs has a lug length of approximately one-third of a width of the track.

In some embodiments, each traction lug of the plurality of traction lugs has a lug length of approximately one-quarter of a width of the track.

In some embodiments, the plurality of traction lugs is arranged in a 2-1 repeating pattern.

In some embodiments, the plurality of traction lugs is arranged in a 2-2 repeating pattern.

In some embodiments, at least some traction lugs in the plurality of traction lugs are longitudinally spaced from each other by 5 to 8 inches (127 millimetres to 203.2 millimetres, respectively).

In some embodiments, the rear idler wheel assembly has four idler wheels.

In some embodiments, the track assembly further includes a dynamic traction device having one end connected to the frame and another end connected to the vehicle when the track assembly is in use.

In some embodiments, the track has a track perimeter of 135 inches to 180 inches (3429 millimetres to 4572 millimetres, respectively).

In some embodiments, the front idler wheel assembly has a front idler wheel assembly radius, the bottom surface of each of the left slide rail and the right slide rail has an upward curvature having an upward radius of curvature, the upward curvatures of the left slide rail and the right slide rail are sized such that the track bends around the front idler wheel assembly and the upward curvatures of the left and right slide rails about an effective wheel radius, and the effective wheel radius is greater than each of the front idler wheel assembly radius and the upward radius of curvature.

In some embodiments, the drive wheel, the front idler wheel assembly, the rear idler wheel assembly, the bottom surfaces of the left and right slide rails, and the track are sized and positioned relative to each other such that when: a) the track assembly is mounted to the vehicle, b) the vehicle is traveling forward on flat level surface terrain covered with snow, and c) the track is being driven by the drive wheel about a path around the drive wheel, the front idler wheel assembly, the left and right slide rails, and the rear idler wheel assembly, each traction lug in the plurality of the traction lugs enters the snow substantially perpendicular to the flat level surface terrain. In such embodiments, each traction lug remains perpendicular to the flat level surface terrain as the track travels about its path at least until that traction lug begins to exit the snow.

In a further aspect, there is also provided a vehicle having a rotatable rear axle that is structured for mechanical attachment of a wheel thereto and having an embodiment of the track assembly described above being attached to the axle to support the vehicle on terrain.

In some embodiments, the vehicle is one of: an All-Terrain Vehicle, a Side-by-Side Vehicle, and a wheelchair.

Additional and/or alternative features, aspects, and advantages of embodiments of the present technology will become apparent from the following description, the accompanying drawings, and the appended claims.

BRIEF DESCRIPTION OF THE DRAWINGS

The drawings included herewith are for illustrating various embodiments of articles, products, methods, and apparatuses described in the present specification. The drawings could not be to scale. Some features shown in the drawings could be exaggerated, or scaled down, relative to their possible "life" size(s), in order to make these features clearly visible in the drawings.

In the drawings.

DETAILED DESCRIPTION

The headings in this section of the document are used solely to improve readability of the detailed description, and were not meant to be used for, and must not be used for, interpreting any of the information included in the detailed description. The headings do not separate the detailed description into sections, and the detailed description should be read and interpreted as though the headings in the detailed description do not exist.

Directions

Figure 1:
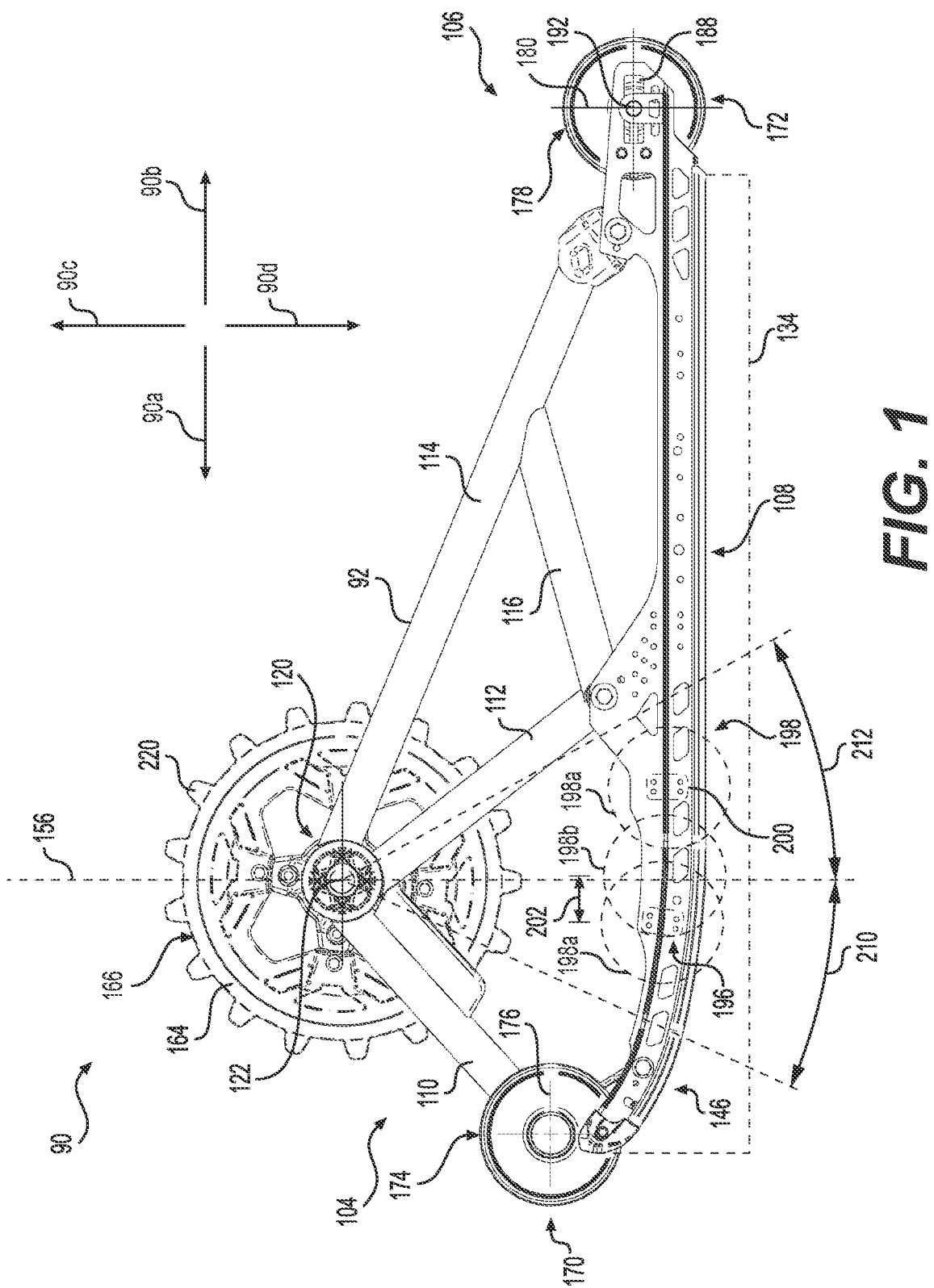
FIG. 1 is a left side view of a track assembly, according to a first embodiment.

With reference to FIG. 1, a forward direction, as the term is used in this document, is shown with reference numeral 90a. A rearward direction, as the term is used in this document, is shown with reference numeral 90b. An upward direction is shown with reference numeral 90c. A downward direction, as the term is used in this document, is shown with reference numeral 90d.

Figure 2:
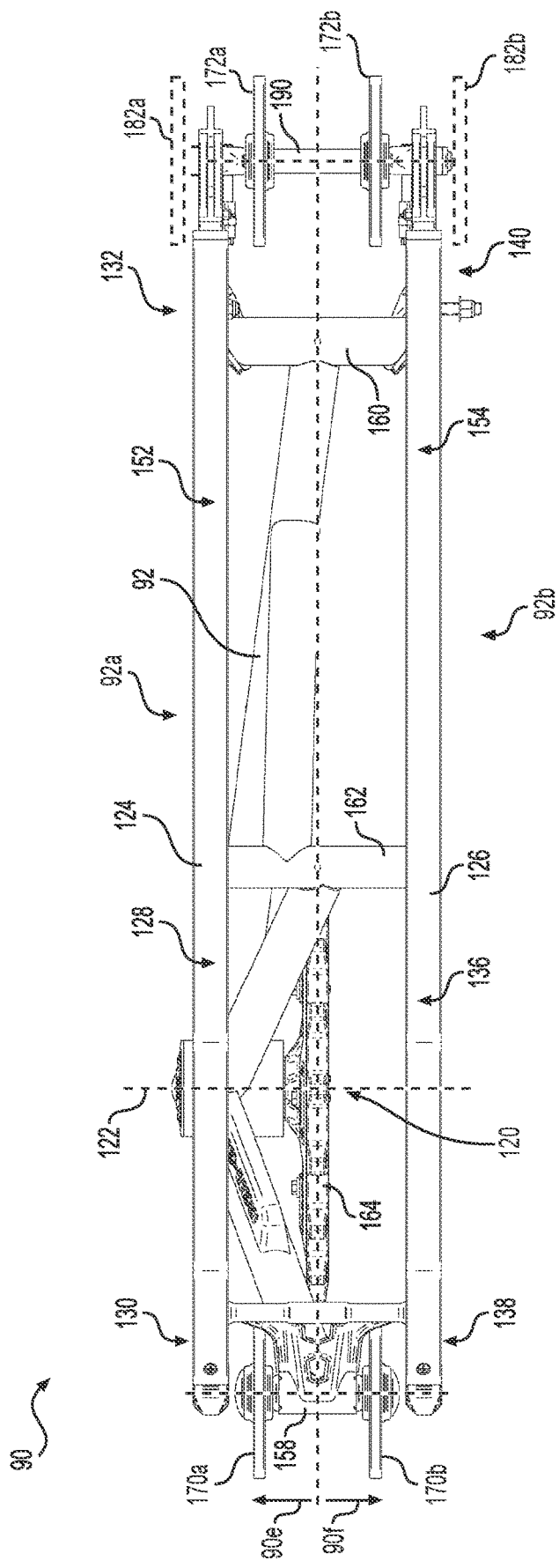
FIG. 2 is a bottom view of the track assembly of FIG. 1.

With reference to FIG. 2, a leftward direction, as the term is used in this document, is shown with reference numeral 90e. A rightward direction, as the term is used in this document, is shown with reference numeral 90f.

Track Assembly—General

Figure 3:
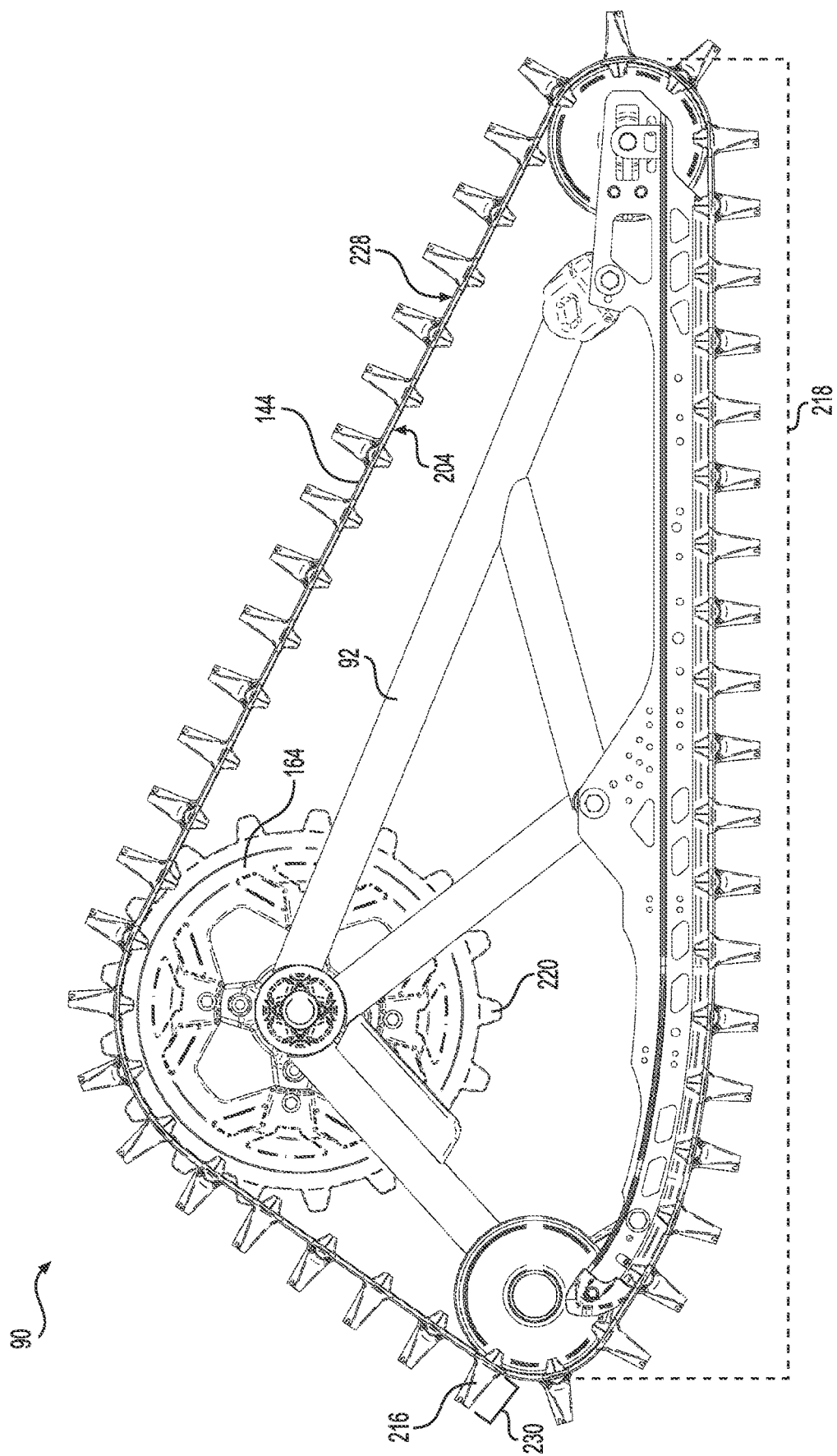
FIG. 3 is a left side view of the track assembly of FIG. 1, with a track mounted thereon.

FIGS. 1 to 4 show a track assembly 90 for a vehicle. The track assembly 90 has a frame 92. As shown in FIGS. 1 and 2, the frame 92 has a left side 92a (FIG. 2), a right side 92b (FIG. 2), a front 104 (FIG. 1), a rear 106 (FIG. 2), and a bottom 108 (FIG. 3). The frame includes a plurality of frame members 110-116. The frame members 110-116 are welded to each other and are thus non-mobile relative to each other in this embodiment.

The frame 92 is suspensionless. It is contemplated that in other embodiments the frame 92 would include a suspension, such that, for example an upper part of the frame 92 would be sprung relative to a lower part of the frame 92 (not shown).

Figure 7:
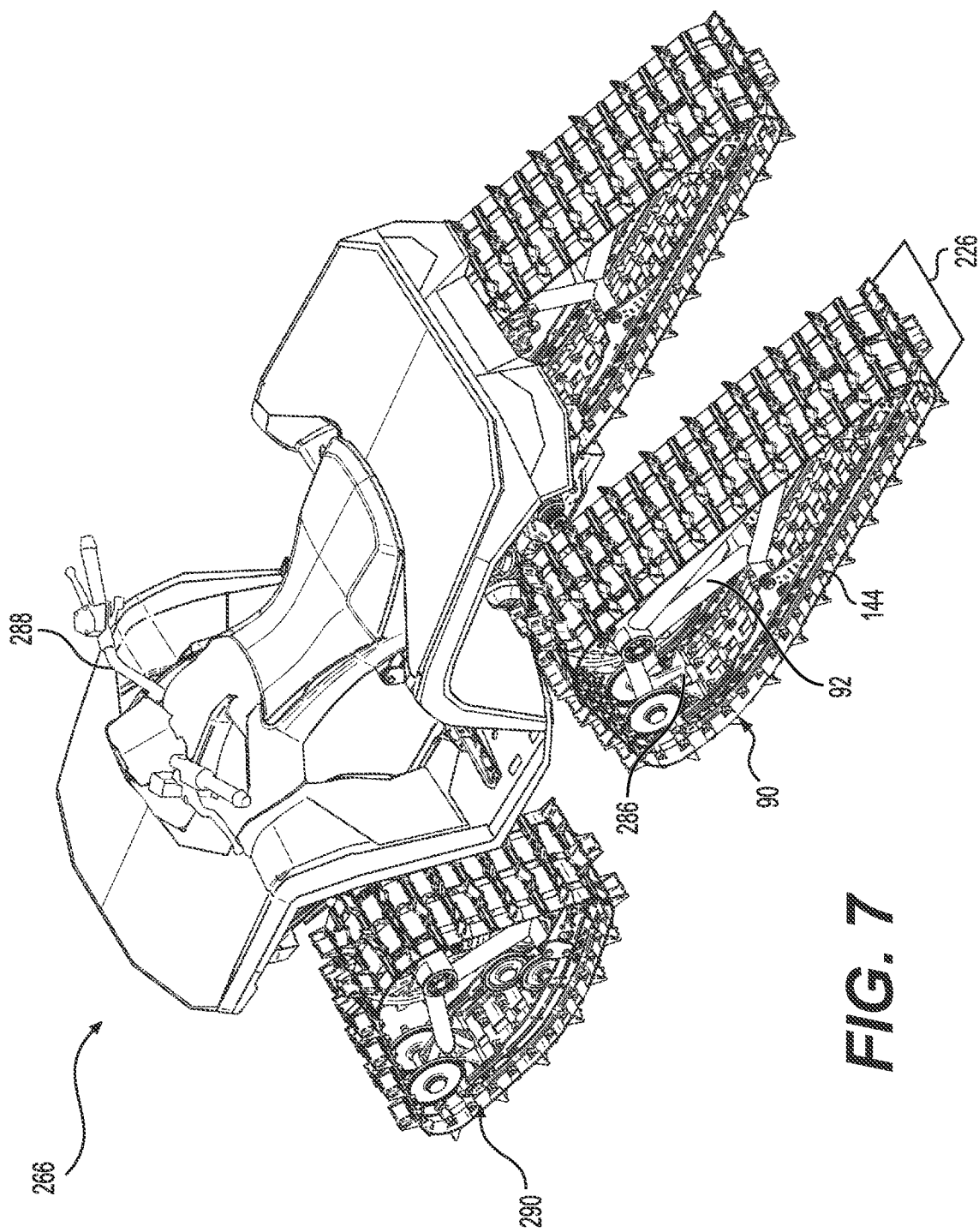
FIG. 7 is a perspective view of a vehicle with the track assembly of FIGS. 1 to 4 mounted onto a left side of the rear axle of the vehicle.
Figure 8:
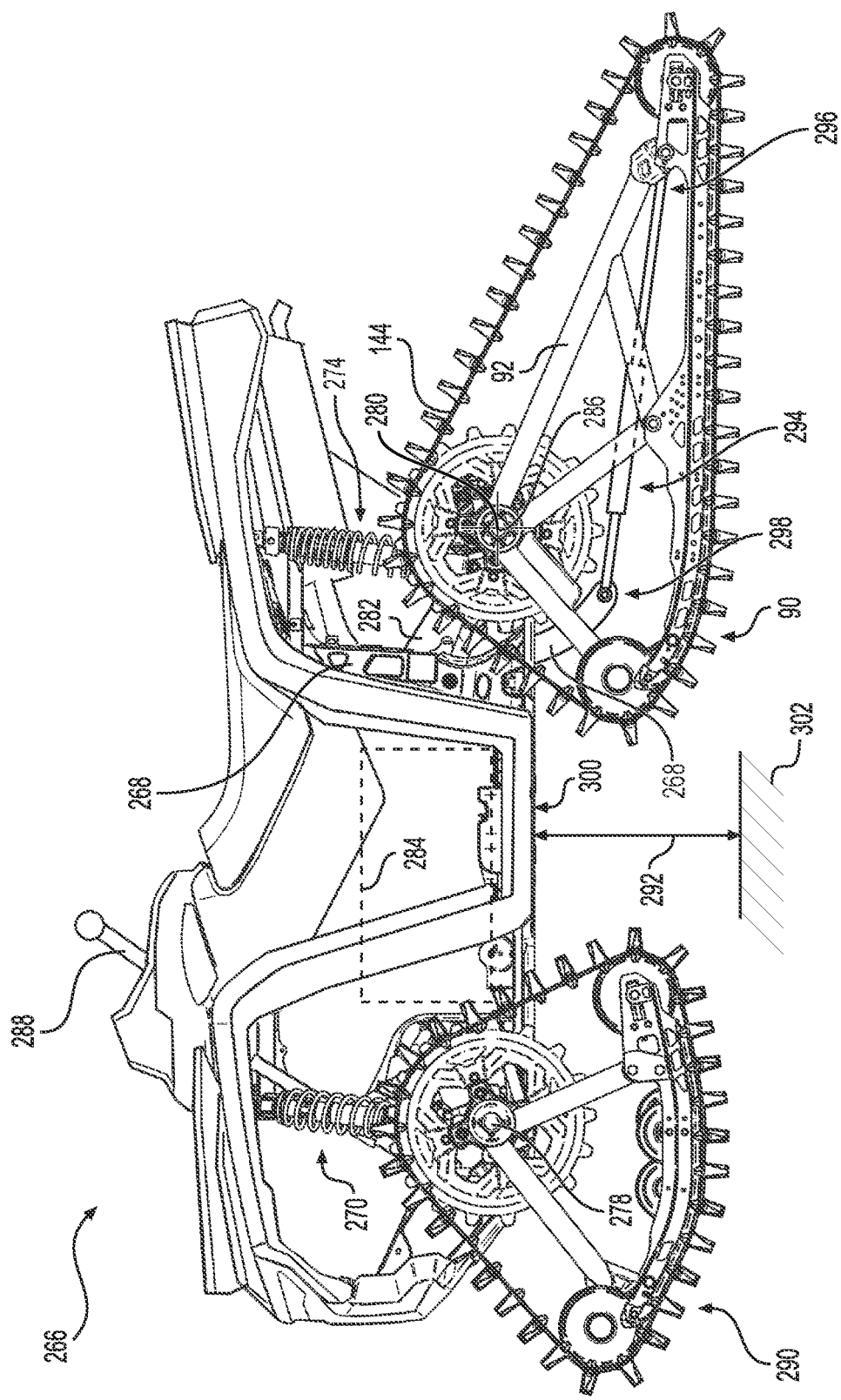
FIG. 8 is a side view of the vehicle of FIG. 7.

In this embodiment, a drive wheel 164 is rotatably secured on the frame 92 at a junction point of the frame members 110, 112, 114, to rotate about a drive wheel axis 122. The drive wheel 164 has a vehicle axle attachment portion 120 structured to allow the drive wheel 164 to be bolted to a wheel hub or other structure of a vehicle that is connected to an axle of the vehicle and which wheel hub or other structure normally receives a wheel of the vehicle. The drive wheel 164 is thus attachable to an axle of the vehicle instead of a wheel of that vehicle, co-axially with the drive wheel axis 122 and the axis of rotation of the wheel hub or other structure. The vehicle axle attachment portion 120 in this embodiment has a plurality of apertures defined therethrough which match a bolt pattern of the wheel hub of a vehicle to which the drive wheel 164 is to be bolted. It is contemplated that any other suitable attachment of the drive wheel 164 to an axle of a vehicle could be used. An example of a vehicle axle and vehicle are shown in FIGS. 7 and 8, and are described in more detail later in this document. The non-mobile frame members 110-116 extend from the vehicle axle attachment portion 120 to slide rails 124, 126.

Slide Rails [48] The frame 92 has a longitudinally-extending left slide rail 124, which is connected to the frame members 110-116 at the bottom 108 of the frame 92. The left slide rail 124 has a bottom surface 128, a front end 130, a rear end 132, and a length 134.

The frame 92 also has a longitudinally-extending right slide rail 126, which is connected to the frame members 110-116 at the bottom 108 of the frame 92. The right slide rail 126 has a bottom surface 136, a front end 138, a rear end 140, and a length (which in this embodiment is equal to the length 134 of the left slide rail 124).

The bottom surface 128, 136 of each of the left and right slide rails 124, 126 is positioned such that it is supportable by a track 144 against terrain. As best shown in FIG. 1, in some embodiments, the bottom surface 128, 136 of each of the left and right slide rails 124, 126 is provided by a slide made of an ultra high molecular weight ("UHMW") polymer. In the present embodiment, each of the slides is held on its corresponding slide rail 124, 126 by a combination of T-slot and a screw. It is contemplated that the slides could be secured using a different suitable mechanism, including an adhesive. It is contemplated that the slides could be made integral with corresponding ones of the slide rails 124, 126. In some embodiments, instead of having the slides, the bottom surfaces 128, 136 of the slide rails 124, 126 are coated with a low-friction material such as a UHMW polymer.

Figure 4:
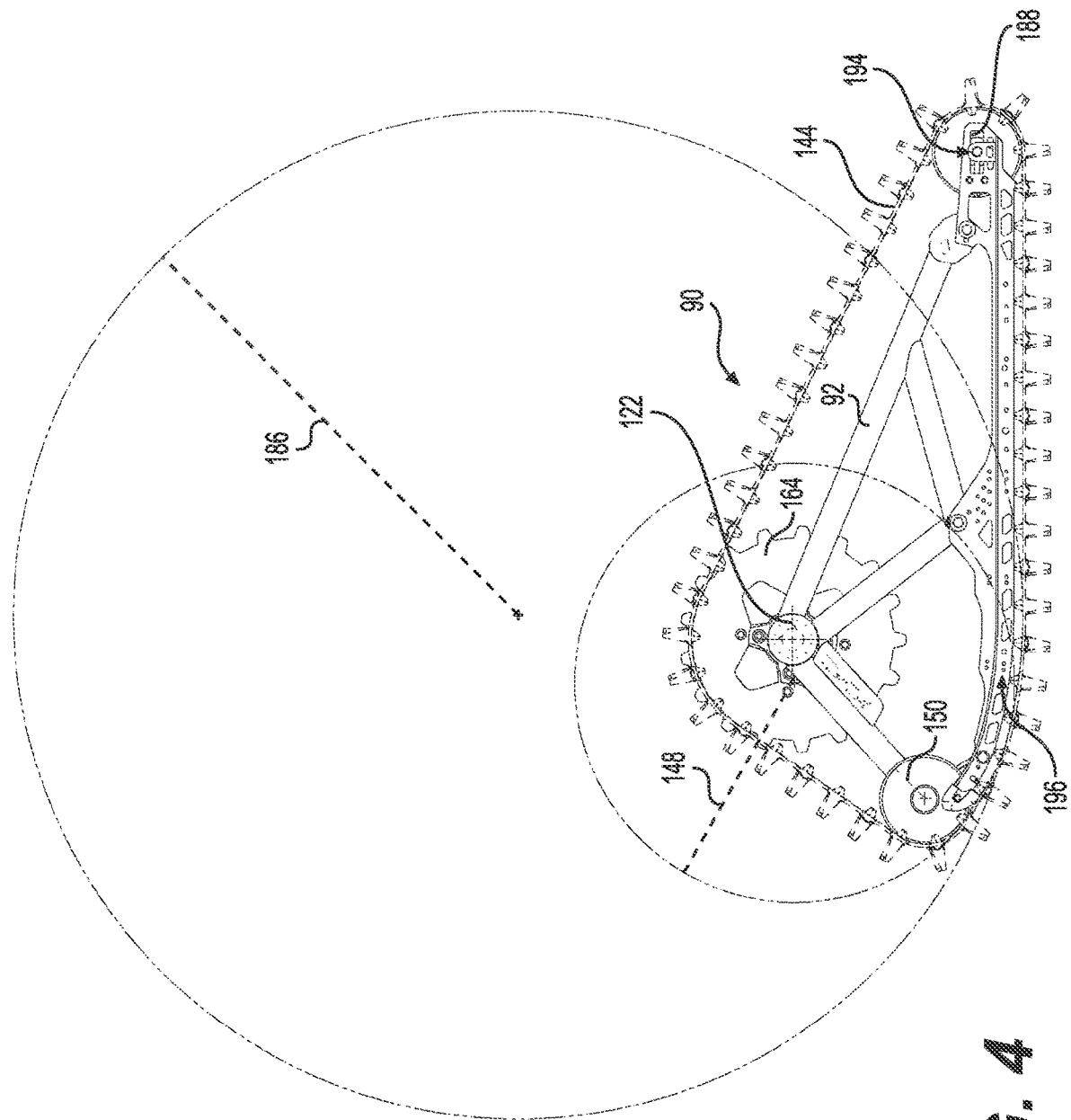
FIG. 4 is a left side view of the track assembly of FIG. 3, showing an effective wheel radius of the track assembly.

The front end 130, 138 of each slide rail 124, 126 is connected to the first one 110 of the plurality of frame members 110-116 of the frame 92, and the rear end 132, 140 of each slide rail is connected to a second one 114 of the plurality of frame members 110-116. The front end 130, 138 of each of the left and the right slide rails 124, 126 has an upward curvature 146. The upward curvature 146 of each of the left and the right slide rails 124, 126 has an upward radius of curvature 148 (FIG. 4).

The front end 130, 138 of each slide rail 124, 126 is connected to the first one 110 of the plurality of frame members 110-116 via a first transverse member 158, and the rear end 132, 140 of each slide rail 124, 126 is connected to the second one 114 of the plurality of frame members 110-116 via a second transverse member 160.

The frame member 112 is connected to the frame member 114 via the frame member 116. The frame members 110-116 are located between the left and the right slide rails 124, 126. The frame members 110-116 are located vertically between the left and the right slide rails 124, 126.

The slide rails 124, 126 are connected to a third one 112 of the plurality of frame members 110-116 via a third transverse member 162 at a point intermediate the front end 130, 138 and the rear end 132, 140 of the slide rails 124, 126.

The bottom surfaces 128, 136 of the slide rails 124, 126 include flat track supporting surfaces 152, 154 which extend rearward 90b from the upward curvature 146 of the front end 130, 138 toward the rear end 132, 140, and in some embodiments extend rearward 90b past the rear idler wheel assembly 172. The rear idler wheel assembly 172 is described later in this document.

The flat track supporting surfaces 152, 154 are about 36.5 inches (927 millimeters) long. In some embodiments, the flat track supporting surfaces 152, 154 are between about 40 inches (1016 millimeters) and about 52 inches (1321 millimeters) long. It is contemplated that other lengths could be used. As best shown in FIGS. 1, 3 and 4, approximately two-thirds of the length 134 of each of the slide rails 124, 126 is positioned rearward 90b of a vertical transverse drive wheel plane 156.

It is contemplated that in other embodiments, the track assembly 90 need not have slide rails 124, 126, in which case standard known frames with mid-rollers (not shown) for driving the track 144 on terrain could be used.

Wheel Assemblies

The drive wheel 164 has a peripheral surface 166. The peripheral surface 166 of the drive wheel 164 extends upward 90c above the frame 92. The drive wheel axis 122 is positioned in a vertical transverse drive wheel plane 156.

The track assembly 90 has a front idler wheel assembly 170, and a rear idler wheel assembly 172. The forward idler wheel assembly 170 has a peripheral surface 174 and is connected to the frame 92 at the front of the frame 92 for rotation about a forward idler wheel axis 176 that is parallel to the drive wheel axis 122. It is contemplated that the forward idler wheel assembly 170 could be connected to the frame 92 for rotation about the forward idler wheel axis 176 by being rotationally connected to the slide rails 124, 126. The peripheral surface 174 extends forward 90a of the front ends 130, 138 of the slide rails 124, 126. The front idler wheel assembly 170 has two front idler wheels 170a, 170b (FIG. 2). It is contemplated that the front idler wheel assembly 170 could have more than two wheels, or a single wheel.

The rear idler wheel assembly 172 has a peripheral surface 178. The rear idler wheel assembly 172 is connected to the frame 92, via the rear ends of the slide rails 124, 126, at the rear of the frame 92 for rotation about a rear idler wheel assembly axis 180 that is parallel to the drive wheel axis 122. It is contemplated that the rear idler wheel assembly 172 could be connected to the frame 92 for rotation about the rear idler wheel assembly axis 180 by being connected directly to the frame 92 instead of or in addition to being rotationally connected to the slide rails 124, 126. The peripheral surface 178 extends rearward of the rear ends 132, 140 of the slide rails 124, 126. The rear idler wheel assembly 172 has two idler wheels 172a, 172b. It is contemplated that the rear idler wheel assembly 172 could have more than two wheels, or a single wheel.

In a particular embodiment, the front idler wheel assembly 170 has two idler wheels 170a, 170b. The rear idler wheel assembly 172 has two idler wheels 172a, 172b. As shown with dashed lines in FIG. 2, in some embodiments, the rear idler wheel assembly 172 has four idler wheels 172a, 172b, 182a, 182b (the two additional wheels 182a, 182b are shown in dashed lines). Four-wheeled versions of the rear idler wheel assembly 172 provide advantages in some applications.

As shown in FIG. 4, the front idler wheel assembly 170 has a front idler wheel assembly radius 150. Each of the upward curvatures 146 of the slide rails 124, 126 has an upward radius of curvature 148. In this embodiment, the upward radius of curvature 148 of the left slide rail 124 is equal to the upward radius of curvature 148 of the right slide rail 126.

The upward radii of curvature 148 of the slide rails 124, 126 and the front idler wheel assembly radius 150 are sized such that the track 144 bends around the front idler wheel assembly 170 and the upward curvatures 146 about an effective wheel radius 186, and the effective wheel radius 186 is greater than each of the front idler wheel assembly radius 150 and the upward radii of curvature 148.

Tensioner Assembly

The slide rails 124, 126 have transversely aligned tensioner apertures 188 that extend longitudinally in the respective slide rails 124, 126. The rear idler wheel assembly 172 is mounted onto a rearward axle 190 (FIG. 2) via known ball bearings (not shown). The rearward axle 190 is slidably mounted within the apertures 188 via a known bolt (not shown, received inside the rearward axle 190) and nut combination 192 (FIG. 1). The rearward axle 190, and the bolt and nut combination 192 may be collectively referred to as a tensioner assembly 194 (FIG. 4.).

The tensioner assembly 194 is configured such that when the nut is loosened, the tensioner assembly 194 is slidable along the length of the apertures 188, and such that when the nut is tightened, the tensioner assembly 194 is fixed in a position in the apertures 188. The rear idler wheel assembly 172 is thus selectively movable between a plurality of longitudinally-distributed tension positions to tension a track 144 that may be supported by the track assembly 90.

The tensioner assembly 194 is a known mechanism. It is contemplated that any other suitable tensioner assembly could be used. It is contemplated that the forward idler wheel assembly 170 could be implemented, instead of or in addition to the rear idler wheel assembly 172, with a suitable tensioner assembly such that forward idler wheel assembly 170 would be movable between a plurality of longitudinally-distributed tension positions to tension the track 144.

Mid-Rollers

In this embodiment, the track assembly 90 excludes wheels (i.e. has no wheels) between the front end 130 and the rear end 132 of the left slide rail 124, and excludes wheels (i.e. has no wheels) between the front end 138 and the rear end 140 of the right slide rail 126. The wheels of the front idler wheel assembly 170 and the rear idler wheel assembly 172, and the drive wheel 164 are the sole wheels of the track assembly 90 contacting the track 144. This configuration may provide for improved slide durability in some applications.

Each of the slide rails 124, 126 has a plurality of mid-roller support apertures 196 distributed along its length. The mid-roller support apertures 196 are arranged to receive one or more wheels (which will be referred to as "mid-rollers 198", shown in dashed lines in FIG. 1) in at least one position on the slide rails 124, 126. An example set of positions of the mid-rollers 198 is shown in FIG. 1.

In this embodiment, the apertures 196 are configured to receive wheel mounting brackets 200 (could be any suitable wheel mounting brackets) with one or more mid-rollers 198 rotationally attached to each of the mounting brackets 200. In this embodiment, each wheel mounting bracket 200 has one mid-roller 198 rotationally attached thereto.

The mid-roller support apertures 196 on the left side rail 124 are longitudinally offset from the mid-roller support apertures 196 on the right side rail 126, as shown with reference arrow 202, such that when mid-rollers 198 are mounted to these apertures 196 (in this example, via the brackets 200), the mid-roller(s) 198a on the left side rail 124 are longitudinally offset from the mid-roller(s) 198b on the right side rail 126.

The longitudinal offset of the mid-rollers 198 may reduce vibration experienced by the track assembly 90 when the track assembly 90 is in use, in some applications. It is contemplated that in some embodiments, the slide rails 124, 126 may be configured to receive mid-rollers 198 that would be longitudinally aligned relative to each other when rotationally mounted to the slide rails 124, 126.

As shown in FIG. 1, the mid-roller support apertures 196 are positioned to support two mid-rollers 198a on the left side rail 124, and one mid-roller 198b on the right side rail 126. It is contemplated that a different combination, longitudinal offset, and number (including zero) of mid-rollers 198 could be used, depending on the application of the track assembly 90 and the particular track 144 used with the track assembly 90.

For example, there could be pairs of longitudinally-aligned mid-roller support apertures 196 in the slide rails 124, 126. Each of the pairs could be sized to receive an axle with one or more mid-rollers 198 thereon and could be positioned to provide suitable protrusion(s) of the mid-roller(s) 198 below the bottom surfaces 128, 136 of the slide rails 124, 126. It is contemplated that there may be different numbers and different combinations of positions of mid-roller support apertures 196.

In other words, the mid-roller support apertures 196 are wheel attachment features. In an aspect, the mid-roller support apertures 196 may allow users of the track assembly 90 to reconfigure the track assembly 90 by adding one or more mid-rollers 198 to adapt the track assembly 90 to different types of terrain and other riding conditions.

It is contemplated that any other suitable mechanism for mounting mid-rollers 198 to the slide rails 124, 126 could be used. For example, the system disclosed in the commonly owned U.S. Pat. No. 8,240,782, entitled "Track assembly", issued Aug. 14, 2012, could be used. U.S. Pat. No. 8,240,782 is hereby incorporated herein by reference in its entirety.

The track assembly 90 is operable without any mid-rollers 198 in at least some applications. Thus, it is contemplated that the slide rails 124, 126 could have no apertures or other wheel attachment features that would be configured to receive mid-rollers 198.

In some embodiments of the track assembly 90 that include mid-rollers 198, the mid-rollers 198 are sized and positioned to protrude below the bottom surfaces 128, 136 of the slide rails 124, 126 to roll against an inner surface 204 of the track 144. In some such embodiments, the mid-rollers 198 are positioned relative to the left slide rail 124 and the right slide rail 126 to extend downward past the bottom surface of each of the slide rails 124, 126 by 2/25.4 inches (2 millimetres).

It is contemplated that mid-rollers 198, when present, could be positioned relative to the slide rails 124, 126 to extend downward past the bottom surfaces 128, 136 of the slide rails 124, 126 by a distance that is in a range of 2/25.4 inches to 6/25.4 inches (2 millimetres to 6 millimetres, respectively). Such ranges of protrusion below the bottom surfaces 128, 136 of the slide rails 124, 126 may provide improved slide durability in some applications.

In some embodiments of the track assembly 90 that include mid-rollers 198, and as shown in FIG. 1, the mid-rollers 198 are positioned relative to the slide rails 124, 126 within 20 degrees away from (in either direction) the vertical transverse drive wheel plane 156 starting from the drive wheel axis 122 in a downward 90d direction along said plane 156 (see reference arrows 210, 212 in FIG. 1 illustrating schematically a +20° angle and a −20° angle). Such positioning of mid-roller(s) 198 may improve performance of the track assembly 90 in some applications.

Track and Track Assembly Length

As shown in FIGS. 3-4 and 7-8, a track 144 is supported around the drive wheel 164, the forward and rear idler wheel assemblies 170, 172, and the bottom surfaces 128, 136 of the slide rails 124, 126. The track 144 is suitably tensioned by adjustment of the tensioner assembly 194 via known tensioning methods.

As shown in FIG. 3, the track assembly 90 has a length 218, measured as a horizontal distance between a foremost point on the track 144 and a rearmost point on the track 144 (excluding the height 230 of the traction lugs 216).

In this embodiment, the length 218 is approximately 58 inches (1473.2 millimetres). In some embodiments, the length 218 is between 54 inches (1371.6 millimetres) and 65 inches (1651 millimetres). A length 218 of the track assembly 90 in this range may provide performance advantages in some applications. The length 218 of the track assembly 90 in combination with the traction lug height(s) 230 may provide performance advantages in some applications.

Figure 5:
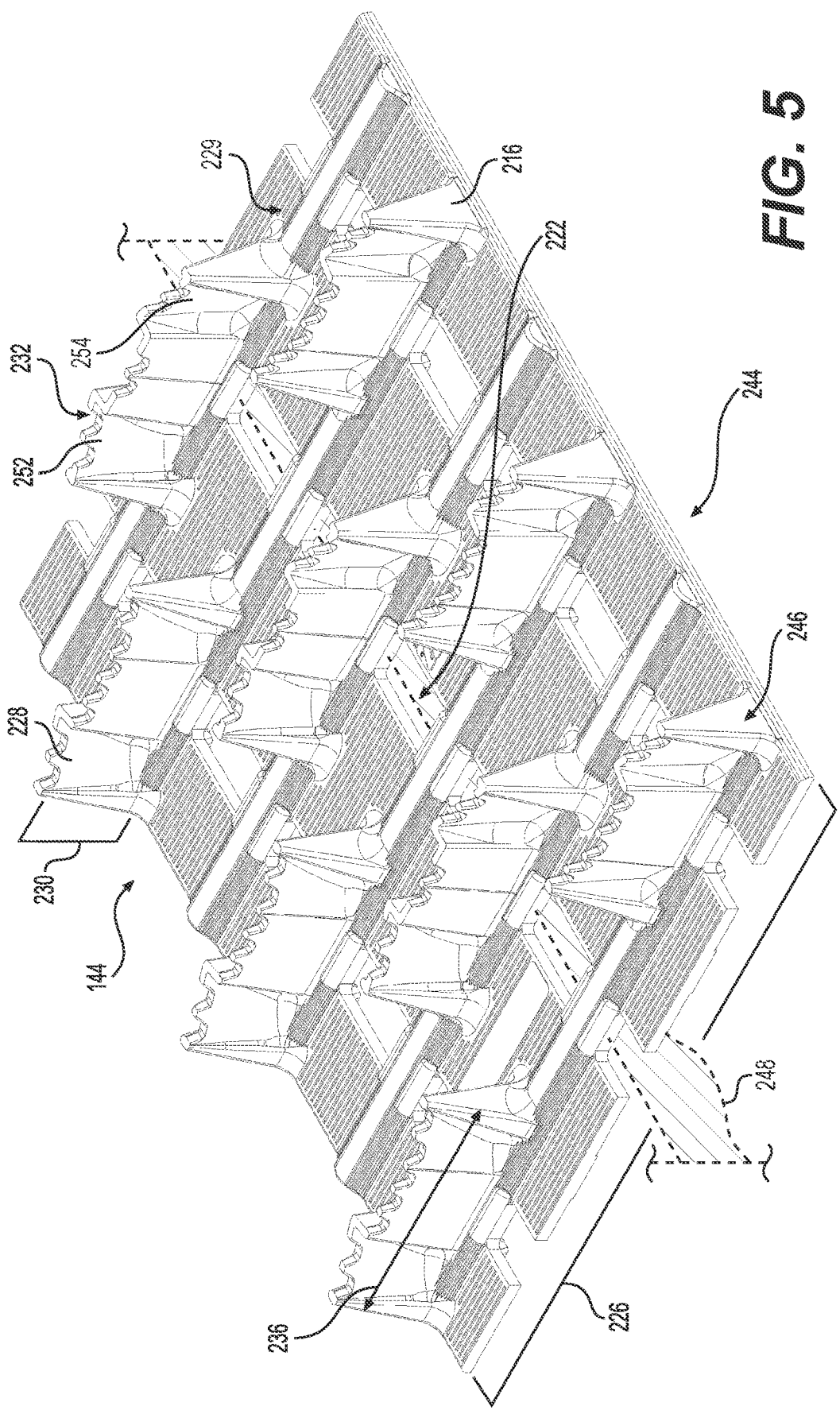
FIG. 5 is a perspective view of a portion of the track of FIGS. 3 and 4.

The track 144 is in driving engagement with the drive wheel 164. In this embodiment, the drive wheel 164 is a drive sprocket 164 that has circumferentially-positioned teeth 220 that extend away from the drive wheel 164, and the track 144 has a plurality of drive apertures 222 (FIG. 5). The drive apertures 222 are positioned in the track 144 to receive the teeth 220 of the drive sprocket 164 as the drive sprocket 164 rotates the track 144.

The drive wheel 164, the front idler wheel assembly 170, the rear idler wheel assembly 172, and the bottom surfaces 128, 136 of the slide rails 124, 126 define a track perimeter.

The track perimeter is about 138 inches (3505.2 millimetres). In some embodiments, the track perimeter is between 130 inches (3302 millimetres) and 150 inches (3810 millimetres). In some embodiments, the track perimeter is between 135 inches (3429 millimetres) and 180 inches (4572 millimetres).

As shown in FIGS. 5 and 7, the track 144 has a width 226, which in this embodiment is 14 inches (355.6 millimetres). In some embodiments, the track 144 has a width 226 that is between 13 inches (330.2 millimetres) and 15.5 inches (393.7 millimetres).

Traction Lug Materials, Hardness and Height

The track 144 has a plurality of traction lugs 216 extending outwardly from an outer surface 229 of the track 144. The traction lugs 216 are distributed longitudinally on the outer surface 229 of the track 144, as shown in FIG. 5.

The track 144 and the traction lugs 216 are made of an elastomeric material. In this embodiment, each of the traction lugs 216 has a hardness in a range of 70 to 95 shore A and is made from natural rubber. It is contemplated that the traction lugs 216 could be made from a different material, such as a synthetic rubber, and could be made to have a different hardness.

Figure 6:
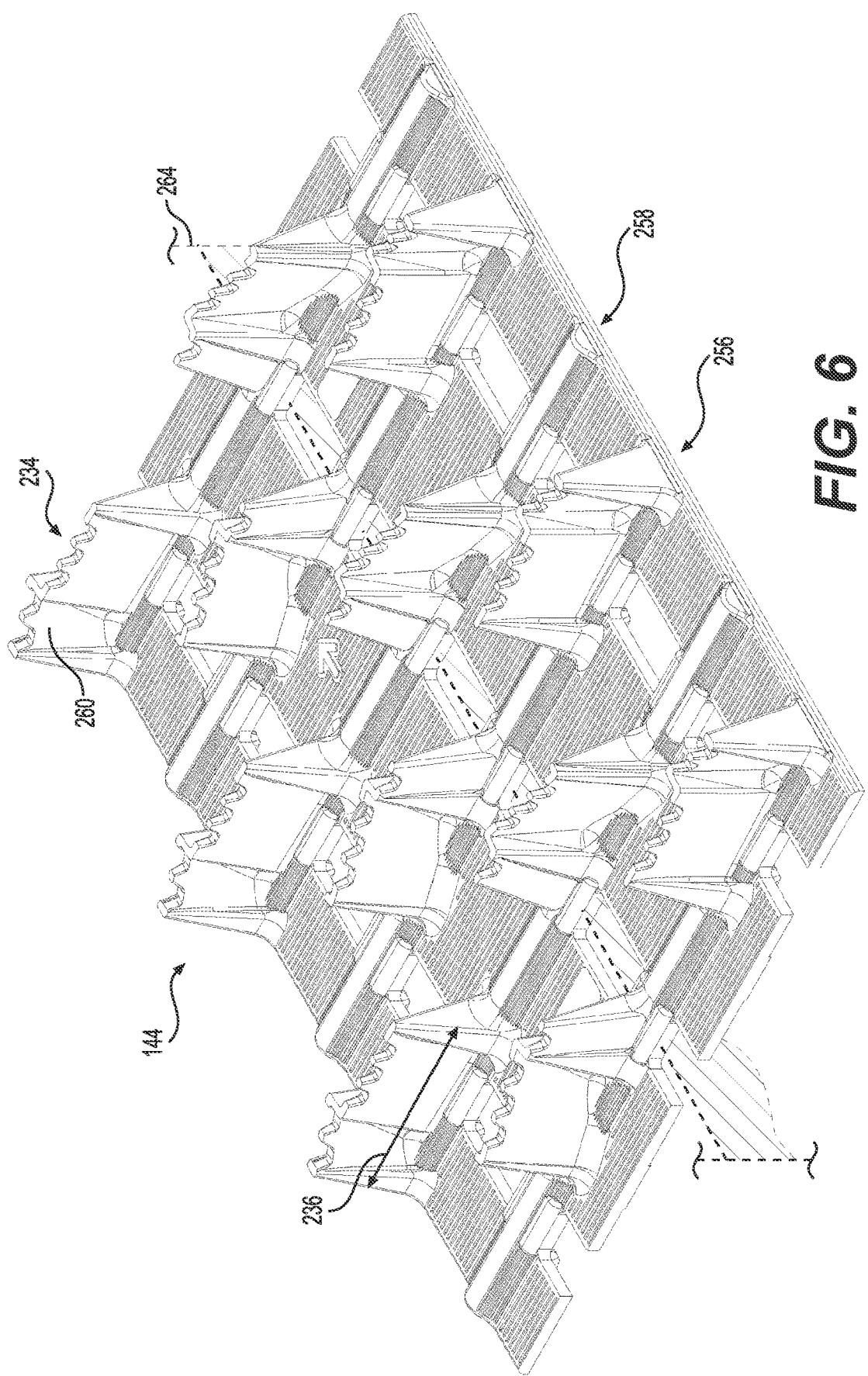
FIG. 6 is a perspective view of a portion of the track similar to that of FIG. 5, but according to another embodiment.

Each of the traction lugs 216 has a lug height 230. The lug height 230 of each traction lug 216 is an average height of that traction lug 216. As shown in FIG. 5, the traction lugs 216 of a given track 144 may have one or more groove patterns 232. A first groove pattern 232 is shown in FIG. 5. A second groove pattern 234, of an alternate embodiment of the track 144, is shown in FIG. 6.

In the embodiment of FIG. 5, each of the traction lugs 216 has a lug height 230 of 2 inches. In some embodiments, the traction lugs 216 have a lug height 230 that is in a range of 1.6 inches (40.6 millimeters) to 2.5 inches (63.5 millimeters).

Traction lugs 216 of the track 144 could have one and the same lug height 230 or could include a plurality of different lug heights 230, the lug heights 230 being in one of the above ranges.

Traction Lug Length

As best shown in FIG. 5, each traction lug 216 has a lug length 236 of approximately one-third the width 226 of the track 144. In the embodiment of the track 144 shown in FIG. 6, each traction lug 216 has a lug length 236 of approximately one-quarter of the width 226 of the track 144. In this embodiment, the traction lugs 216 all have one and the same lug length 236. In some embodiments of the track 144, the traction lugs 216 could have different lug lengths 236.

Traction Lug Patterns

The traction lugs 216 in each of the three longitudinal rows of traction lugs shown in FIG. 5 are longitudinally spaced from each other by 6 inches (152.4 millimetres). It is contemplated the traction lugs 216 in each of the three longitudinal rows of traction lugs could be longitudinally spaced from each other by 5 to 8 inches (i.e. a traction lug 216 may be longitudinally spaced from a longitudinally adjacent traction lug 216 by 5 to 8 inches) (127 millimetres to 203.2 millimetres, respectively). Such longitudinal spacing provides improved performance in some driving conditions. In the embodiment shown in FIG. 5, each traction lug 216 in each of the three longitudinal rows of traction lugs 216 is longitudinally offset by 3 inches (76.2 millimetres) from each adjacent traction lug in the adjacent longitudinal row(s) of traction lugs 216. This spacing is referred to as pitch. That is, in the embodiment of FIG. 5, the pitch is 3 inches (76.2 millimetres).

In some embodiments, the track 144 has traction lugs 216 with a combination of different longitudinal spacings in each given longitudinal row of traction lugs, the different longitudinal spacings being within the range of 5 to 8 inches (127 millimetres to 203.2 millimetres, respectively).

The traction lugs 216 of the track 144 of FIG. 5 are in a 2-1 repeating pattern (a row 244 of lugs having one traction lug 216 is followed by a row 246 of lugs having two traction lugs 216). The traction lugs 216 are substantially perpendicular to a longitudinal vertical center plane 248 of the track 144. In other embodiments, the traction lugs 216 of the track 144 have different patterns.

In this embodiment, each traction lug 216 in one sub-plurality of traction lugs 216 has one angled portion 228, the angled portion 228 being angled relative to the longitudinal vertical center plane 248. Each traction lug 216 in another sub-plurality of traction lugs 216 has two angled portions 252, 254, the angled portions 252, 254 being angled relative to the longitudinal vertical center plane 248 and being substantially symmetrically positioned about longitudinal vertical center plane 248.

In the embodiment of the track 144 of FIG. 6, the traction lugs 216 are arranged in a 2-2 repeating pattern (a first row 256 of traction lugs 216 having two traction lugs 216 is followed by a second row 258 of traction lugs 216 having two traction lugs 216). Each of the traction lugs 216 has an angled portion 260. The angled portion 260 is angled relative to a longitudinal vertical center plane 264 of the track 144. In some embodiments, the track shown in FIG. 6 is used on front track assemblies and the track shown in FIG. 5 is used on rear track assemblies. This provides performance advantages in some applications and driving conditions.

The various configurations of the track 144 described in this document may provide performance advantages in some applications. The various described configurations of the track 144 in combination with the length 218 of the track assembly 90 when the length 218 of the track assembly 90 is in a range of about 54 inches (1371.6 millimetres) to about 65 inches (1651 millimetres) may provide performance advantages in some applications.

Perpendicular Entry of Traction Lugs into Snow

In some embodiments, the drive wheel 164, the front idler wheel assembly 170, the rear idler wheel assembly 172, the bottom surfaces 128, 136 of the left and right slide rails 124, 126, and the track 144 are sized and positioned relative to each other such that when the track assembly is mounted to a vehicle, such as an All Terrain Vehicle ("ATV"), the following operation occurs.

When the vehicle is traveling forward 90a on flat level surface terrain (not shown) covered with snow, and the track 144 is being driven by the drive wheel 164 about a path around the drive wheel 164, the front idler wheel assembly 170, the left and right slide rails 124, 126, and the rear idler wheel assembly 172, the traction lugs 216 of the track 144 enter the snow substantially perpendicular to flat level surface terrain. The traction lugs 216 remain substantially perpendicular to the flat level surface terrain as the track 144 travels about the path at least until the traction lugs 216 begin (i.e. each traction lug 216 begins) to exit the snow.

Exemplary Vehicle

An exemplary application of the track assembly 90 to a vehicle 266 is described next, with reference to FIGS. 7 and 8. The vehicle 266 is an ATV. It is contemplated that the vehicle 266 could be, instead, for example, a Side-by-Side Vehicle, or a motorized wheelchair configured to receive one or more of the track assemblies 90 (rear), 290 (front).

The ATV 266 has a vehicle frame 268. The vehicle frame 268 supports a front left suspension 270, a front right suspension (not shown), a rear left suspension 274, and a rear right suspension (not shown). The rear left suspension 274 includes a swing arm 282. The rear right suspension includes a swing arm. The rear right suspension is a mirror image of the rear left suspension 274. Therefore, a description of the rear left suspension 274 corresponds to a description of the rear right suspension. Therefore, further description of the rear right suspension is omitted.

The vehicle frame 268 supports a front left axle 278, front right axle (not shown), a rear left axle 280, and a rear right axle (not shown). The rear right axle is supported by the rear right suspension. The rear left axle 280 is supported by the rear left suspension 274. The front right axle is supported by the front right suspension. The front left axle 278 is supported by the front left suspension 270.

The front right axle is a mirror image of the front left axle 278. The rear right axle is a mirror image of the rear left axle 280. Therefore, a description of the front left axle 278, and the rear left axle 280, corresponds to a description of the front right axle and the rear right axle, respectively. Therefore, further description of the front right axle and the rear right axle is omitted.

The vehicle frame 268 supports a motor 284 (shown schematically). The motor 284 is connected to the rear left axle 280 via a transmission (not shown) to rotate the rear left axle 280 about a rear axle drive axis 286 to propel the vehicle 266.

The vehicle frame 268 pivotably supports a handlebar 288. The handlebar 288 is connected to the front axles 278 to pivot the front axles 278 to steer the ATV 266. Pivoting of the handlebar 288 pivots the front track assemblies 290 of the ATV and steers the ATV 266 when the ATV 266 is in motion.

The track assembly 90 is connected/attached to the rear left axle 280 by the drive wheel 164 being bolted to a wheel hub of the ATV 266, located at an outer end of the rear left axle 280 of the ATV 266 axle, co-axial with an axis of rotation of the wheel hub of the rear left axle 280. The rear left axle 280 drives the wheel hub, and the wheel hub drives the drive wheel 164.

A rear right track assembly, which is a mirror image of the track assembly 90, is similarly connected to the rear right axle of the ATV. The rear right track assembly is a mirror image of the track assembly 90. Therefore, a description of the track assembly 90 corresponds to a description of the rear right track assembly 90. Therefore, further description of the rear right track assembly is omitted.

The front track assemblies 290 are connected to the front axles 278 in a similar manner and have tracks that are the same as the track shown in FIG. 6 mounted thereon. In this embodiment, the track 144 of the rear left track assembly 90 is of the embodiment shown in FIG. 5.

Ground Clearance Ratio

The ATV has a ground clearance 292, which is measured as an average distance of the bottom 300 of the ATV from terrain 302 when the ATV is on terrain 302 and is at its gross vehicle weight. The ground clearance 292 is sized to be about 18 inches, so that a ratio between the length 218 of the rear track assembly 90 and the ground clearance 292 is 3.28.

In some embodiments, the combination of the ground clearance 292 and the length 218 of the track assembly is sized to provide a ratio between the length 218 of the track rear assembly 90 and the ground clearance 292 that is between 2.8 and 3.5.

Dynamic Traction Device

The track assembly 90 includes the dynamic traction device 294 connected at one end 296 to the frame 92 of the rear track assembly 90, and to the frame 268 of the ATV 266 at another end 298. The dynamic traction device 294, and its functions, are shown and described in the commonly owned U.S. patent application Ser. No. 15/485,699, filed on Apr. 12, 2017 and entitled "Track System for Attachment to a Vehicle", which application is hereby incorporated herein in its entirety.

It is contemplated that a suitable anti-rotation link could be used instead of the dynamic traction device 294. Such an anti-rotation link could be connected between the vehicle frame 268 and the rear track assembly 90 and could be configured to limit rotation of the track assembly 90 relative to the ATV 266 so that the rear track assembly 90 does not come into contact with the vehicle frame 268 when the ATV 266 is in use. It is contemplated that in some cases, the rear track assembly 90 could be used without a dynamic traction device 294 and without an anti-rotation link.

Miscellaneous

It is contemplated that new vehicles, such as the ATV 266, could be equipped for sale with one or more of the track assembly 90. It is contemplated that an existing vehicle could be retrofitted by replacing, for example, one or more wheels of the existing vehicle with the track assembly 90.

Thus, the track assembly 90 could be sized and dimensioned to be attached to the rear axle of a vehicle when, for example, a rear wheel of that vehicle, is removed. It is contemplated that the track assembly 90 could be sized and dimensioned to be attached to more than one type of vehicle, and to more than one type of axle of the vehicle.

It is contemplated that the track assembly 90 could be sized and dimensioned to be attached to a front axle of a vehicle when, for example, a front wheel, is removed. It is contemplated that the track assembly 90 could be sized and dimensioned to replace a range of vehicle wheel sizes.

It is contemplated that the track assembly 90 and the track 144 could be made of any suitable combination of materials. It is contemplated that the track assembly 90 could be manufactured, assembled, or sold without a track 144. It is contemplated that the track assembly 90 could be manufactured, assembled, or sold without a track 144 being mounted on the track assembly 90.

Embodiments of the present technology each have at least one of the above-mentioned object and/or aspects, but do not necessarily have all of them. It should be understood that some aspects of the present technology that have resulted from attempting to attain an above-mentioned object may not satisfy this object and/or may satisfy other objects not specifically recited herein.

Modifications and improvements to the above-described embodiments of the present technology may become apparent to those skilled in the art. The foregoing description is intended to be exemplary rather than limiting.

The invention claimed is:

1. A track assembly to be mounted to a rotatable rear axle of a vehicle, the rotatable rear axle being structured for mechanical attachment of a wheel thereto, comprising:
    a frame having a front, a rear, a bottom, a left side, and a right side, the frame further including:
        a longitudinally-extending left slide rail positioned at the bottom of the frame, the left slide rail having a bottom surface having an upward curvature, a front end, a rear end and a length; and
        a longitudinally-extending right slide rail positioned at the bottom of the frame, the right slide rail having a bottom surface having an upward curvature, a front end, a rear end, and a length;
        at least two transverse members connecting the left slide rail to the right slide rail to maintain the left slide rail at an equal distance from the right slide rail during operation of the track assembly;
        a front frame member and a rear frame member extending upwardly from the at least two transverse members;
    a drive wheel rotationally mounted to the frame for rotation about a drive wheel axis positioned in a vertical drive wheel plane, the drive wheel being supported by the frame at a constant height above the left and right slide rails during operation of the track assembly, the drive wheel having a peripheral surface, the drive wheel being structured to be attached to the axle of the vehicle when the wheel is removed;
    a front idler wheel assembly mounted at the front of the frame at a fixed position between the left and right slide rails for rotation about a front idler wheel assembly axis parallel to and at a constant distance during operation from the drive wheel axis, the front idler wheel assembly having a peripheral surface and including a first idler wheel and a second idler wheel disposed on either side of the drive wheel plane;
    a rear idler wheel assembly mounted at the rear of the frame for rotation about a rear idler wheel assembly axis parallel to and at a constant distance during operation from the drive wheel axis, the rear idler wheel assembly having a peripheral surface and including a first idler wheel and a second idler wheel disposed on either side of the drive wheel plane, the rear idler wheel assembly having a rearward axle supporting the first and second rear idler wheels and extending through tensioner apertures defined in the left and right slide rails, the rearward axle being independent from and rearward of the at least two transverse members; and
    a track having an inner surface facing the drive wheel, and an outer surface opposite the inner surface, the outer surface having a plurality of traction lugs distributed along the outer surface, the track defining a plurality of drive apertures into which the plurality of radially extending sprocket teeth extend to propel the track, the plurality of drive apertures extending between the left and right slide rails;
    the drive wheel, the front idler wheel assembly and the rear idler wheel assembly being positioned relative to the frame to support the track around the drive wheel peripheral surface, the front idler wheel assembly peripheral surface, and the rear idler wheel assembly peripheral surface,
    the track being in driving engagement with the drive wheel and being supported by the left and right slide rails for sliding on the bottom surfaces of the left and right slide rails,
    the rearward axle of the rear idler wheel assembly being in a fixed position within the tensioner apertures to tension the track during operation of the track assembly,
    a horizontal distance between a foremost point on the outer surface of the track and a rearmost point on the outer surface of the track being between 54 inches and 65 inches, the front and rear idler wheel assemblies being unmovably fixed relative to the left and right slide rails during operation of the track assembly so as to maintain the horizontal distance between the foremost point and the rearmost point on the outer surface of the track constant, and
    each traction lug of the plurality of traction lugs having a height in a range of 1.6 inches to 2.5 inches.

2. The track assembly of claim 1, wherein the drive wheel, wheels of the front idler wheel assembly and wheels of the rear idler wheel assembly are the sole wheels of the track assembly contacting the track.

3. The track assembly of claim 1, further comprising a plurality of mid-rollers, each mid-roller of the plurality of mid-rollers being connected to at least one of the left slide rail and the right slide rail to rotate about a mid-roller axis that defines a mid-roller plane with the drive wheel axis, the mid-roller plane defining an angle with the vertical drive wheel plane that has a magnitude of not more than 20 degrees.

4. The track assembly of claim 3, wherein the plurality of mid-rollers is positioned relative to the left slide rail and the right slide rail such that each mid-roller in the plurality of mid-rollers extends downward past the bottom surface of each of the left slide rail and the right slide rail by 2/25.4 inches to 6/25.4 inches.

5. The track assembly of claim 1, wherein each traction lug of the plurality of traction lugs has a lug length of approximately one-third of a width of the track.

6. The track assembly of claim 1, wherein each traction lug of the plurality of traction lugs has a lug length of approximately one-quarter of a width of the track.

7. The track assembly of claim 1, wherein the plurality of traction lugs is arranged in a 2-1 repeating pattern.

8. The track assembly of claim 1, wherein the plurality of traction lugs is arranged in a 2-2 repeating pattern.

9. The track assembly of claim 1, wherein at least some traction lugs in the plurality of traction lugs are longitudinally spaced from each other by 5 to 8 inches.

10. The track assembly of claim 1, wherein the rear idler wheel assembly has four idler wheels.

11. The track assembly of claim 1, wherein the track assembly further comprises a dynamic traction device having one end connected to the frame and another end connected to the vehicle when the track assembly is in use.

12. The track assembly of claim 1, wherein the track has a track perimeter of 135 inches to 180 inches.

13. The track assembly of claim 1, wherein the drive wheel, the front idler wheel assembly, the rear idler wheel assembly, the bottom surfaces of the left and right slide rails, and the track are sized and positioned relative to each other such that when:
   the track assembly is mounted to the vehicle,
   the vehicle is traveling forward on flat level surface terrain covered with snow, and
   the track is being driven by the drive wheel about a path around the drive wheel, the front idler wheel assembly, the left and right slide rails, and the rear idler wheel assembly,
   each traction lug in the plurality of the traction lugs enters the snow substantially perpendicular to the flat level surface terrain and remains perpendicular to the flat level surface terrain as the track travels about its path at least until that traction lug begins to exit the snow.

14. A vehicle having a rotatable rear axle that is structured for mechanical attachment of a wheel thereto, comprising the track assembly of claim 1, the track assembly being attached to the axle to support the vehicle on terrain, and the vehicle being one of an all-terrain vehicle, a utility-terrain vehicle, a side-by-side vehicle, and a wheelchair.

15. The vehicle of claim 14, wherein the vehicle has a ground clearance, and a ratio between a) the distance between the foremost point on the outer surface of the track and the rearmost point on the outer surface of the track, and b) the ground clearance is between 2.8 and 3.5.

16. A track assembly to be mounted to a rotatable rear axle of a vehicle, the rotatable rear axle being structured for mechanical attachment of a wheel thereto, the track assembly comprising:
   a frame having a front, a rear, a bottom, a left side, and a right side, the frame including:
      a longitudinally-extending left slide rail positioned at the bottom of the frame, the left slide rail having a bottom surface having an upward curvature, a front end, a rear end and a length; and
      a longitudinally-extending right slide rail positioned at the bottom of the frame, the right slide rail having a bottom surface having an upward curvature, a front end, a rear end, and a length;
      at least two transverse members connecting the left slide rail to the right slide rail to maintain the left slide rail at an equal distance from the right slide rail during operation of the track assembly;
      a front frame member and a rear frame member extending upwardly from the at least two transverse members;
   a drive wheel rotationally mounted to the frame for rotation about a drive wheel axis positioned in a vertical drive wheel plane, the drive wheel being supported by the frame at a constant height above the left and right slide rails during operation of the track assembly, the drive wheel having a peripheral surface, the drive wheel being structured to be attached to the axle of the vehicle when the wheel is removed;
   a front idler wheel assembly mounted at the front of the frame at a fixed position between the left and right slide rails for rotation about a front idler wheel assembly axis parallel to and at a constant distance during operation from the drive wheel axis, the front idler wheel assembly having a peripheral surface and including a first idler wheel and a second idler wheel disposed on either side of the drive wheel plane;
   a rear idler wheel assembly mounted at the rear of the frame for rotation about a rear idler wheel assembly axis parallel to and at a constant distance during operation from the drive wheel axis, the rear idler wheel assembly having a peripheral surface and including a first idler wheel and a second idler wheel disposed on either side of the drive wheel plane, the rear idler wheel assembly having a rearward axle supporting the first and second rear idler wheels and extending through tensioner apertures defined in the left and right slide rails, the rearward axle being independent from and rearward of the at least two transverse members; and
   a track having an inner surface facing the drive wheel, and an outer surface opposite the inner surface, the outer surface having a plurality of traction lugs distributed along the outer surface, the track defining a plurality of drive apertures into which the plurality of radially extending sprocket teeth extend to propel the track, the plurality of drive apertures extending between the left and right slide rails;
   the drive wheel, the front idler wheel assembly and the rear idler wheel assembly being positioned relative to the frame to support the track around the drive wheel peripheral surface, the front idler wheel assembly peripheral surface, and the rear idler wheel assembly peripheral surface,
   the track being in driving engagement with the drive wheel and sliding on the bottom surfaces of the left and right slide rails,
   the rearward axle of the rear idler wheel assembly being in a fixed position within the tensioner apertures to tension the track during operation of the track assembly, and
   the drive wheel, wheels of the front idler wheel assembly and wheels of the rear idler wheel assembly are the sole wheels of the track assembly contacting the track, a horizontal distance between a foremost point on the outer surface of the track and a rearmost point on the outer surface of the track being between 54 inches and 65 inches, the front and rear idler wheel assemblies being unmovably fixed relative to the left and right slide rails during operation of the track assembly so as to maintain the horizontal distance between the foremost point and the rearmost point on the outer surface of the track constant, wherein the drive wheel, the front idler wheel assembly, the rear idler wheel assembly, the bottom surfaces of the left and right slide rails, and the track are sized and positioned relative to each other such that when:

the track assembly is mounted to the vehicle, the vehicle is traveling forward on substantially flat level surface terrain covered with snow, and the track is being driven by the drive wheel about a path around the drive wheel, the front idler wheel assembly, the left and right slide rails, and the rear idler wheel assembly, each traction lug in the plurality of the traction lugs enters the snow substantially perpendicular to the flat level surface terrain and remains perpendicular to the flat level surface terrain as the track travels about its path at least until that traction lug begins to exit the snow.

17. The track assembly of claim 16, wherein the bottom surface of the left slide rail and the bottom surface of the right slide rail include ultra high molecular weight polymer.

18. The track assembly of claim 16, wherein each traction lug of the plurality of traction lugs has a height ranging between about 1.6 inches and about 2.5 inches.

19. A vehicle having a rotatable rear axle that is structured for mechanical attachment of a wheel thereto, comprising the track assembly of claim 16, the track assembly being attached to the axle to support the vehicle on terrain, and the vehicle being one of an all-terrain vehicle, a utility-terrain vehicle, a side-by-side vehicle, and a wheelchair.

20. The track assembly of claim 1, further comprising an intermediate frame member extending between the front and rear frame members, the intermediate frame member extending upwardly from the at least two transverse members toward the drive wheel.

* * * * *